United States Patent
Moeller

(10) Patent No.: US 7,373,091 B2
(45) Date of Patent: May 13, 2008

(54) MULTICASTING OPTICAL SWITCH FABRIC AND METHOD OF DETECTION BASED ON NOVEL HETERODYNE RECEIVER

(75) Inventor: Lothar Benedict Erhard Josef Moeller, Hazlet, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 625 days.

(21) Appl. No.: 10/671,131

(22) Filed: Sep. 25, 2003

(65) Prior Publication Data

US 2005/0069333 A1   Mar. 31, 2005

(51) Int. Cl.
   *H04B 10/06* (2006.01)
(52) U.S. Cl. .............. 398/204; 398/202; 398/205; 398/206; 398/207; 398/208; 398/209; 398/210; 398/211; 398/213; 398/214; 398/182; 398/183; 398/192; 398/193; 398/194; 398/195; 398/196; 398/197; 398/141; 398/155; 398/158; 398/159; 398/160; 398/161; 398/162; 398/163; 398/33; 398/45; 330/59; 330/308; 250/214 A; 250/214 LA; 250/214 AG

(58) Field of Classification Search .............. 398/204, 398/205, 206, 207, 208, 202, 209, 210, 211, 398/213, 214, 182, 183, 192, 193, 194, 195, 398/196, 197, 141, 158, 159, 160, 161, 155, 398/162, 163, 45, 33; 330/59, 308; 250/214 A, 250/214 LA, 214 AG
See application file for complete search history.

(56) References Cited

U.S. PATENT DOCUMENTS

| | | | | |
|---|---|---|---|---|
| 4,718,121 A * | 1/1988 | Epworth | ...................... | 398/203 |
| 5,422,752 A * | 6/1995 | Hardcastle | ................... | 398/187 |
| 6,661,973 B1 * | 12/2003 | Huber et al. | ................... | 398/91 |
| 6,907,052 B2 * | 6/2005 | Kozlowski et al. | .... | 372/29.011 |
| 7,092,645 B1 * | 8/2006 | Sternowski | ................... | 398/204 |
| 2002/0167708 A1 * | 11/2002 | Tsao et al. | ................... | 359/191 |
| 2004/0047561 A1 * | 3/2004 | Tuda | ........................... | 385/39 |
| 2004/0120356 A1 * | 6/2004 | Davenport et al. | ......... | 370/516 |

* cited by examiner

*Primary Examiner*—Hanh Phan

(57) ABSTRACT

The inventors propose herein a switch fabric architecture that allows broadcasting and fast channel access in the ns-range. In various embodiments of the present invention, 10 Gb/s receiver modules are based on a novel heterodyne receiver and detection technique, which is tolerant to moderate wavelength drifts of a local oscillator. A gain clipped electrical amplifier is used in the novel receiver as a rectifier for bandpass signal recovery.

20 Claims, 5 Drawing Sheets

US 7,373,091 B2

MULTICASTING OPTICAL SWITCH FABRIC AND METHOD OF DETECTION BASED ON NOVEL HETERODYNE RECEIVER

FIELD OF THE INVENTION

This invention relates to the field of switch fabrics and, more particularly, to multicasting optical switch fabrics.

BACKGROUND OF THE INVENTION

Optical switch fabrics (OSF) are being considered as a powerful alternative to electrical switch fabrics for the next generation of Terabit/s IP routers. OSFs have been shown to be able to overcome the limitations of fully electrical solutions in throughput capacity and power consumption. However, some recently demonstrated OSFs do not support broadcasting, a desired feature from a networking point of view. In general, broadcasting requires wavelength multiplexing of the data channels on the transmitter side and distribution of the WDM signal to every receiver. In this manner, each receiver may select any channel on demand.

Tight specifications concerning response time, selectivity, and wavelength accuracy are required for an OSF to be used in receivers for such channel selection. Recent progress in the development of rapidly tunable lasers suggests investigating coherent detection schemes for the filtering process. Tunability of the local oscillator (LO) wavelength would allow for selection of any channel out of the WDM data signal as long as it resides in the tuning range of the laser. Additional advantages of this approach would be an amplification of the data signal through the relatively high power of the LO and an ultra-short channel access time since such WDM lasers are substantially the fastest tunable wavelength-heterodyne components known today. However, while the wavelength accuracy of WDM lasers is in the 10 to 100 pm wavelength range, a frequency mismatch between a modulated optical data signal and a WDM laser when used as a LO make it necessary to have some kind of slow and time consuming wavelength fine tuning in conventional coherent detection schemes.

SUMMARY OF THE INVENTION

The inventors propose herein a broadcast optical switch fabric (OSF) based on a heterodyne receiver and detection scheme which is less sensitive to frequency mismatch between a modulated optical data signal and a local oscillator (LO). As such, time consuming wavelength fine tuning is no longer an obstacle for achieving fast channel selection.

In one embodiment of the present invention, a method of channel switching includes mixing an input data signal and a local oscillation frequency signal to generate substantially similar mixed signals on at least two separate paths, comparing the mixed signals and generating a voltage value indicative of a difference in current within the at least two separate paths, gain clipping the voltage value such that a baseband signal is generated, and determining from the baseband signal a resultant logic signal.

In an alternate embodiment of the present invention a novel heterodyne receiver includes a tunable oscillator circuit for outputting a predetermined local oscillation frequency signal to a frequency mixer, a frequency mixer for mixing an input data signal and the predetermined local oscillation frequency signal and outputting substantially similar mixed signals on at least two separate paths, a current comparing means for comparing the mixed signals and generating a voltage value indicative of a difference in current within the at least two separate paths, a gain clipped post amplifier for amplifying the voltage value such that a baseband signal is generated, and a decision circuit for receiving the baseband signal and producing a resultant logic signal.

In an alternate embodiment of the present invention an optical switch fabric includes a plurality of optical transmitters, a multiplexer for combining the optical channels of the optical transmitters, a power splitter for splitting the combined optical channels, and at least one receiver in accordance with the present invention for receiving at least one of the split, combined optical channels.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Although throughout this application the concepts of the present invention are being described with respect to an 8×10 Gb/s WDM heterodyne heterodyne receiver, it should be noted that the specific receiver is simply provided as an embodiment of the present invention and should not be treated as limiting the scope of the invention. It will be appreciated by one skilled in the art informed by the teaching of the present invention that the concepts of the present invention may be applied using such heterodyne receivers as described herein having substantially any numbers of channels and substantially any data rates.

Figure 1:
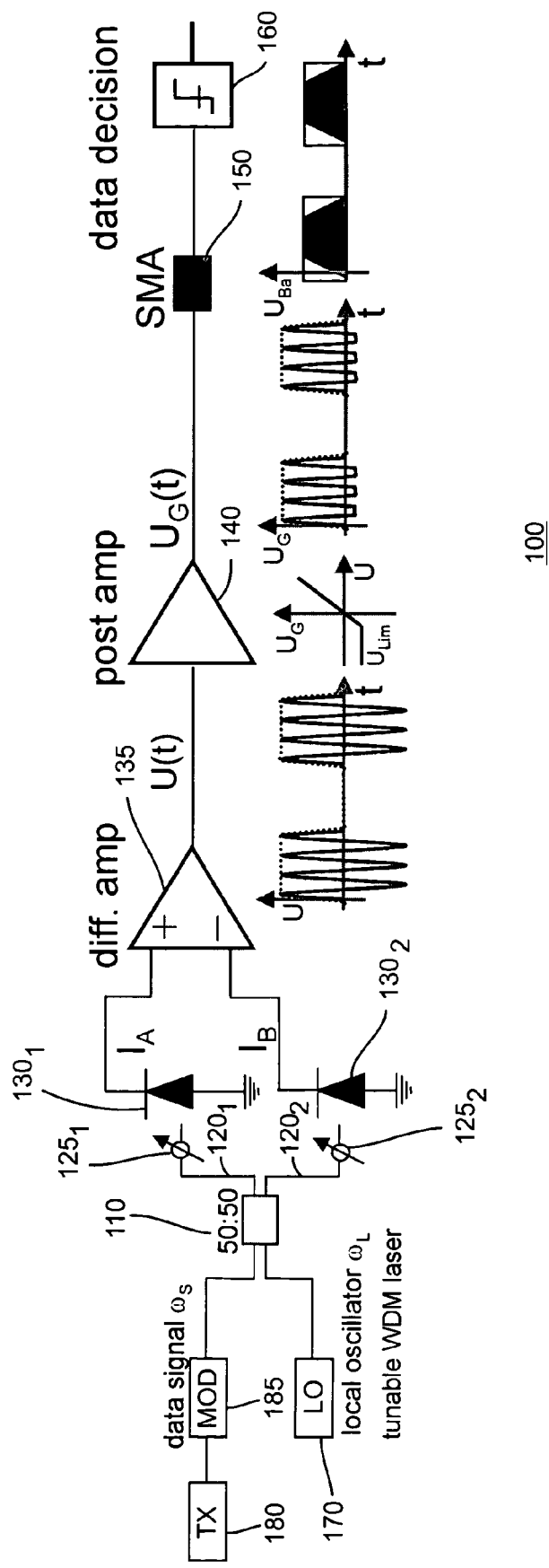
FIG. 1 depicts a high level block diagram of one embodiment of a WDM heterodyne receiver in accordance with the present invention.

FIG. 1 depicts a high level block diagram of one embodiment of a WDM heterodyne receiver in accordance with the present invention. The WDM heterodyne receiver 100 of FIG. 1 comprises a frequency mixer (illustratively a 50:50% 3 dB coupler) 110, two delay lines $120_1$ and $120_2$, two attenuators $125_1$ and $125_2$, two photodetectors (illustratively two photodiodes) $130_1$ and $130_2$, a differential amplifier 135, a post amplifier 140, a low-pass filter (illustratively an SMA connector) 150, and a decision circuit (illustratively, a limiting amplifier) 160. For the sake of simplicity, clock-recovery circuits, non-essential electrical amplifiers, and polarization control units are not depicted in the heterodyne receiver 100 of FIG. 1. Although in FIG. 1, the WDM heterodyne receiver 100 is depicted as illustratively comprising specific components, other components comprising substantially similar functionality as the respective components illustrated in FIG. 1 may replace those respective components in accordance with the present invention. For example, the frequency mixer of the WDM heterodyne receiver 100 of FIG. 1 may be a fusion coupler and the like, the photodiodes may be an optical to electrical (O/E) converter and the like, and the function of the low-pass filter may be implemented within the photodiode to name a few examples.

In the heterodyne receiver 100 of FIG. 1, an input data signal is communicated to a first input port 111 of the 50:50% 3 dB coupler 110. Illustratively in FIG. 1, the input data is provided by a transmitter consisting of a DFB laser 180 followed by a 10 Gb/s Mach-Zehnder modulator 185. The input data signal is split by 3 dB coupler 110 and is output via output ports 115 and 117 of the 3 dB coupler 110. The output ports 115 and 117 are each connected to a respective delay line $120_1$, $120_2$ and a respective attenuator $125_1$ and $125_2$ to facilitate making the signal propagation time and loss in both paths of the output ports 115, 117 substantially equal. The signals from the output ports 115, 117 are detected by a respective one of the two substantially identical photodiodes $130_1$ and $130_2$. The photocurrent outputs $I_A$ and $I_B$ of the photodiodes $130_1$ and $130_2$ are communicated to a respective input port $137_1$ and $137_2$ of the differential amplifier 135. The output signal of the differential amplifier 135 is substantially a voltage that is proportional to the differences of the photocurrents $I_A$ and $I_B$ at the input ports $137_1$, $137_2$ of the differential amplifier 135. The photodiodes $130_1$ and $130_2$ and the differential amplifier 135 make up a balanced front end for the heterodyne receiver 100 of FIG. 1. The balanced front end of the WDM heterodyne receiver 100 of FIG. 1 uses common mode rejection to suppress cross talk stemming from out-of-band channels.

The output voltage, U(t), of the differential amplifier 135 also comprises a beat tone with an angular frequency, $\Delta\omega$, that is equal to the difference between the input data signal wave frequencies, $\omega_S$, and the wave frequencies, $\omega_L$, of a signal from a local oscillator (LO) 170. A signal from the LO 170 is communicated to the second input 113 of the 3 dB coupler 110. The LO 170 of FIG. 1 is illustratively a fast tunable laser diode with a continuous (cw) output power of 5 mW. Typically the beat tone between the input data signal wave frequencies, $\omega_S$, and the wave frequencies, $\omega_L$, of a signal from the LO 170 are in the multi-GHz range. A conventional receiver can not perform data recovery in such a case due to the oscillating character of U(t), the output voltage of the differential amplifier 135.

The output signal of the differential amplifier 135 is communicated to the post amplifier 140. The post amplifier 140 is configured to operate in saturation to generate gain clipping. The gain clipped post amplifier 140 converts the bandpass signal from the balanced front end of the WDM heterodyne receiver 100 of FIG. 1 into a baseband. More specifically, the inventors determined that by moving the DC operation levels of the post amplifier 140 towards its limits, the swing of the output, $U_G(t)$, of the post amplifier 140 is asymmetrically reduced. As such and as illustrated in FIG. 1, the gain clipping of the post amplifier 140 of the WDM heterodyne receiver 100 of FIG. 1 is viewed as producing a baseband signal because the mean of a gain clipped signal is unequal to zero. For example in a simplified view for input levels $U(t)<U_{Lim}<0$ the output stays constant at $U_{GLim}$. For all other cases there is still a linear relation between input and amplified signal ($U_G(t)\sim U(t)$, if $U(t)>U_{Lim}$ holds). The gain clipping of the present invention results in a baseband signal, which may be recovered with data decision circuits after lowpass filtering as depicted above in FIG. 1. More specifically and referring back to FIG. 1, the signal output from the post amplifier is filtered by the low-pass filter (illustratively an SMA connector) 150 and communicated to the limiting amplifier 160.

In the limiting amplifier 160, if the signal level of the filtered output of the post amplifier is higher than a predetermined threshold, the output of the limiting output is a logical high (e.g., +1), but if the signal level of the filtered output of the post amplifier is lower than a predetermined threshold, the output of the limiting output is a logical low (e.g. zero). Although the operation of the limiting amplifier 160 is described herein as providing a logical high output if the signal level of the filtered output of the post amplifier is higher than a predetermined threshold and a logical low output if the signal level of the filtered output of the post amplifier is lower than a predetermined threshold, in alternate embodiments of the present invention the operation of a limiting amplifier in accordance with the present invention may be implemented to operate in reverse.

In the heterodyne receiver of the present invention, such as the heterodyne receiver 100 of FIG. 1, the relatively small sensitivity to frequency mismatch between the modulated optical data signal and a local oscillator (LO) stems from the robust frequency down conversion process. As long as enough beats per bit are generated by the mixing of data and LO signal one beat pulse will be detected by the data recovery unit.

The generation of the baseband signal in accordance with the present invention may be mathematically understood by using a Fourier-series to describe the nonlinear transformation of the gain clipped amplifier. For the simplified case of a half-wavelinear transfer characteristic (i.e., $U_{Lim}=0$) and data pulses with rectangular shape, the generation of the baseband may be characterized according to equation one (1), which follows:

$$U_G(t) = d(t)\frac{1}{\pi} + \frac{1}{2}d(t)\sin(\Delta\omega t) - \frac{2}{3\pi}d(t)\cos(2\Delta\omega t) + \ldots \quad (1)$$

It should be noted that the equation presented above is merely exemplary and to be associated with the specific conditions presented above. Equation (1) above is to be used for understanding the nonlinear transformation of the gain clipped amplifier of the present invention in that specific example, and is not representative of all embodiments of the present invention.

Figure 2:
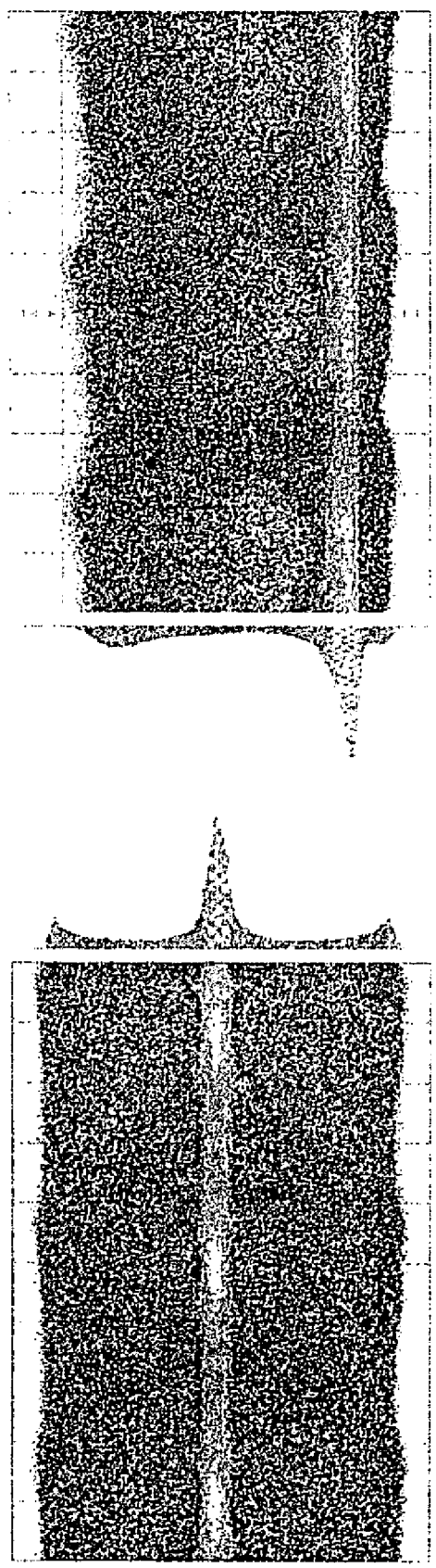
FIG. 2a graphically depicts an eye diagram of the post amplifier of the heterodyne receiver of FIG. 1 without gain clipping (linear operation)
FIG. 2b graphically depicts an eye diagram of the post amplifier of the heterodyne receiver of FIG. 1 implementing gain clipping.
FIG. 2c graphically depicts the RF spectra of the post amplifier of FIGS. 2a and 2b without gain clipping (linear operation) and with gain clipping.

FIG. 2a and 2b graphically depict eye diagrams of the output of a post amplifier of the present invention, such as the post amplifier 140 of the heterodyne receiver 100 of FIG. 1, without gain clipping (linear operation) and with gain clipping, respectively. The beat signal between the data signal and the LO in FIG. 2a and FIG. 2b has a frequency of 23 GHz. Since $U_G(t)$ is an oscillating function, a three level diagram is visible, where the outer traces with larger intensity represent the boundaries of the $U_G(t)$ oscillation when a logical high (e.g., a logical ONE) is transmitted and the horizontal trace in the middle of the eye stems from the logical lows (e.g., the logical ZEROs). The advantage of gain clipping is clearly visible in FIG. 2b, which depicts an asymmetrically deformed eye. By assuming the ZERO level as reference, the eye diagrams of FIG. 2a and FIG. 2b depict the generation of a baseband signal since the mean of the gain clipped signal is unequal to zero.

Figure 2C:
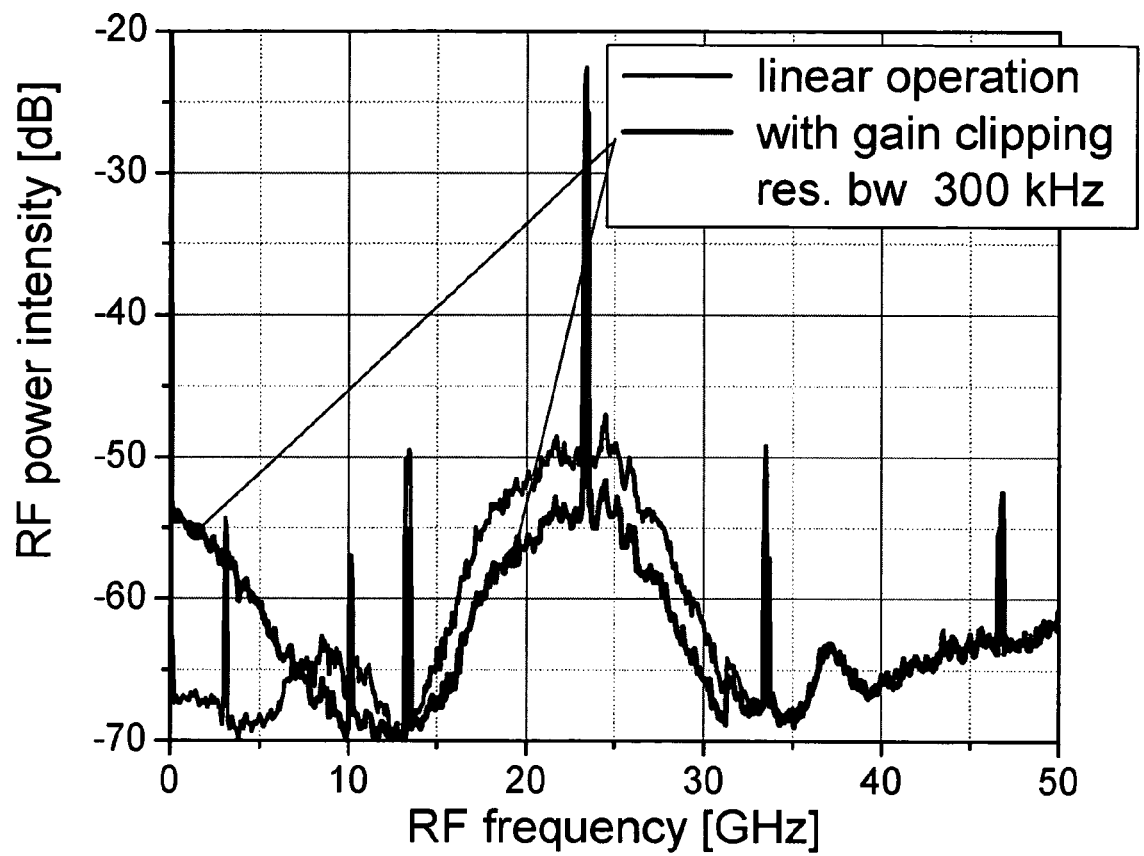

FIG. 2c graphically depicts the RF spectra of the post amplifier of FIGS. 2a and 2b without gain clipping (linear operation) and with gain clipping. In FIG. 2c the RF power intensity in dB is plotted as a function of the RF frequency of the post amplifier output in GHz. As evident in FIG. 2c, when gain clipping is applied, the spectral power density of the bandpass signal at 23 GHz is lowered and the baseband signal's spectrum appears closely to the origin.

However, when using the heterodyne receiver 100 of FIG. 1 in switching mode for channel selection, additional requirements regarding the dynamic behavior and tolerances become important. Specifically, when fast switching is applied a sub optimal beat frequency between the data signal and the LO wave becomes a critical parameter since fine adjustment, (e.g. adjusting a laser temperature control) cannot be used. For example, the optimum beat frequency corresponding to minimum data signal power at a bit-error rate (BER) of $1\times10^{-6}$ (forward error correction (FEC) threshold) is 23.30 GHz. When the beat frequency is increased, the output signal degrades and a vertical eye closure becomes visible due to the electrical bandwidth limitation of the differential amplifier. Beat frequencies smaller than an optimum beat frequency cause a horizontal eye closure by generating timing jitter.

Figure 3:
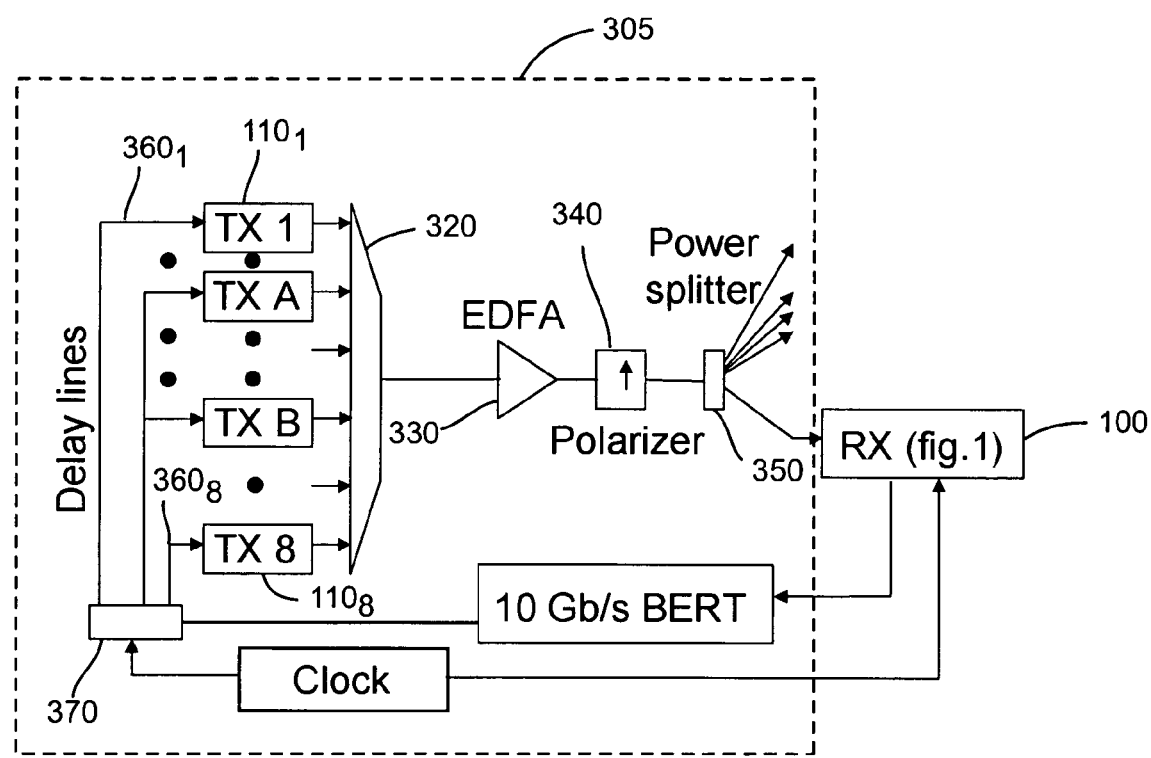
FIG. 3 depicts a high level block diagram of an embodiment of an optical switch architecture including an embodiment of a heterodyne receiver in accordance with the present invention.

FIG. 3 depicts a high level block diagram of an embodiment of an optical switch architecture including the heterodyne receiver 100 of FIG. 1. The optical switch architecture 300 of FIG. 3 comprises a transmitting node 305 comprising a plurality of transmitters (illustratively eight transmitters) $310_1$-$310_8$ (collectively transmitters 310), a wavelength multiplexer 320, an optical amplifier (illustratively an erbium-doped fiber amplifier (EDFA)) 330, a polarizer 340, a power splitter (illustratively a 1:8 power splitter) 350, a plurality of delay lines (illustratively eight delay lines) $360_1$-$360_8$ (collectively delay lines 360), and a central clock distribution unit 370. The optical switch architecture 300 of FIG. 3 further comprises a heterodyne receiver, such as the heterodyne receiver 100 of FIG. 1, in accordance with the present invention.

Although in FIG. 3 the optical switch architecture is illustrated as comprising eight transmitters and eight delay lines, it should be noted that the specific architecture of FIG. 3 is simply provided as an embodiment of the present invention and should not be treated as limiting the scope of the invention. It will be appreciated by one skilled in the art informed by the teaching of the present invention that the concepts of the present invention may be applied in optical switch architectures having substantially any number of transmitters and as such, respective delay lines. In addition, although the optical amplifier 330 in FIG. 3 is depicted as an EDFA, other optical amplifiers having substantially similar functions, such as a semiconductor optical amplifier (SOA), may be implemented within the present invention.

The transmitting node 305 of FIG. 3 mainly consists of eight 10 Gb/s NRZ transmitters with 100 GHz channel spacing. The $2^{31}$-1 PRBS data patterns of the eight channels of the eight transmitters 310 are delayed replicas of each other, except that two of them, depicted as channel A and B in FIG. 3, are in phase. The channels of the transmitters 310 are combined by the wavelength multiplexer 320 and are all amplified simultaneously by the EDFA 330. The combined, amplified optical channels are polarized by the polarizer 340 such that all of the optical channels propagate throughout the system with substantially identical polarizations. The optical signal from the polarizer is split into eight replicas of the combined optical channels by the power splitter 350 and communicated to, for example, eight receivers, such as the receiver 100 of FIG. 1. In FIG. 3 for simplicity of explanation, only a single receiver 100 is depicted. The central clock distribution unit 370 and the delay lines 360 of the optical switch architecture 300 of FIG. 3 are used to synchronize the operation of the transmitters 110 and the receiver(s) 100.

A LO inside the receiver 100 periodically hops between two wavelengths that both have an offset of around 23 GHz from channels A and B and as such, channel A or channel B is selected. The hopping is repeated with a rate denoted by Rp and the BER at the output of the receiver 100 is continuously monitored (BERT not gated). During the switching process a few bits may not be recovered due to missing LO power ($\Delta T_D$). The missing LO power increases the BER of the receiver 100. The more frequently the switching is repeated per time unit, the higher the BER. Specifically, the BER dependence on the repetition rate, (RP), may be characterized according to equation two, (2), which follows:

$$BER(RP)=1\Delta T_D R_p+\frac{1}{2}(1-\Delta T_D R_p)\{BER(cw\_ChA) + BER(cw\ ChB)\}\approx \Delta T_D R_p, (2)$$

where $R_p$ depicts the repetition rate, and $BER_{cw}(A)$ and $BER_{cw}(B)$ are the BER when channel switching is performed with very low rate (~0.1 Hz). The factor 1 in front of $\Delta T_D$ stems from the consideration that during a period of LO dead time, a maximum BER of 0.5 is recorded and two switching events occur per period. In the optical switch architecture 300 of FIG. 3, the $BER_{cw}(A)$ and the $BER_{cw}(B)$ were measured to be less than $1\times10^{-9}$.

Figure 4:
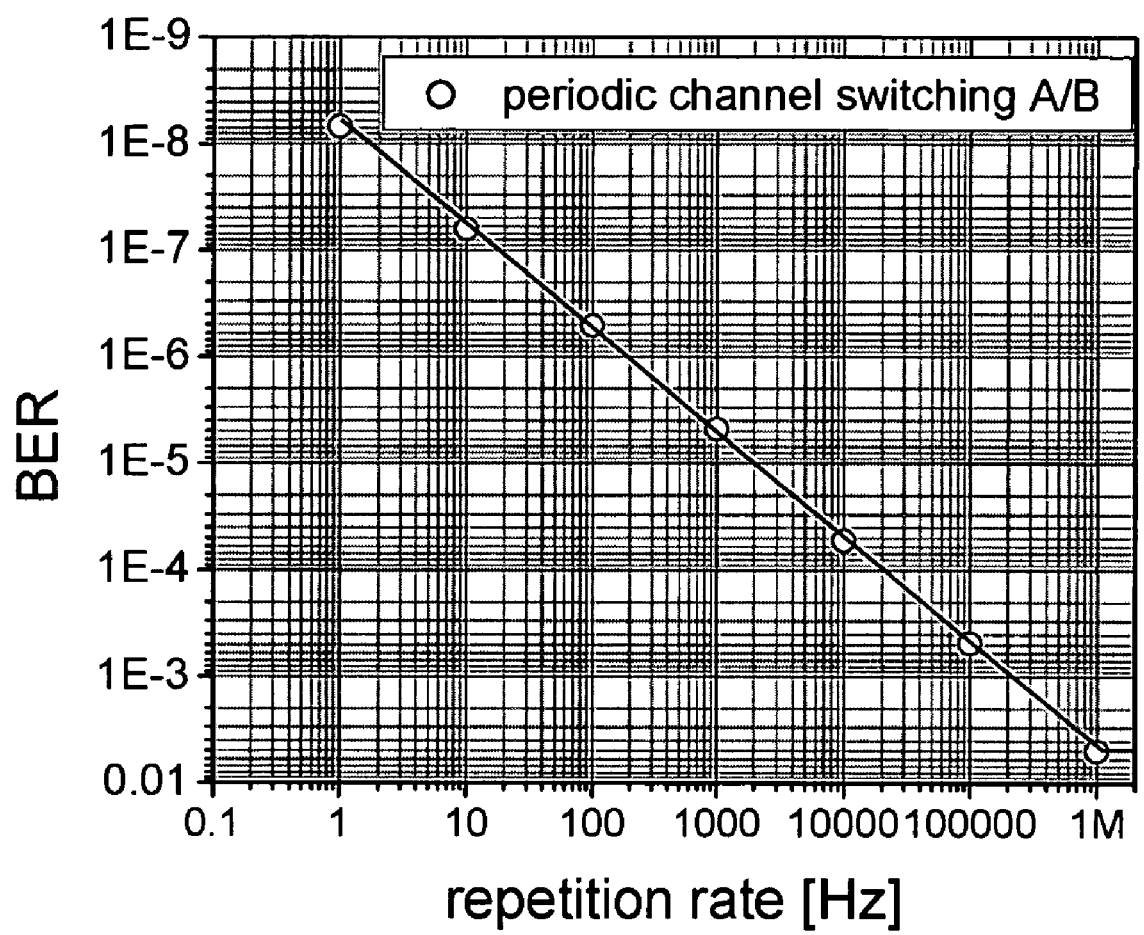
FIG. 4 graphically depicts the bit-error rates of the optical switch architecture of FIG. 3 for repetition rates between 1 HZ and 1 MHz.

FIG. 4 graphically depicts the BERs of the optical switch architecture 300 of FIG. 3 for repetition rates between 1 HZ and 1 MHz. In FIG. 4, the BER of the optical switch architecture 300 of FIG. 3 is plotted as a function of the repetition rate of the switching between channels. As previously stated and evident from FIG. 4, the more frequently the switching is repeated per time unit, the higher the BER.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A heterodyne receiver for use in optical switch fabrics comprising:
    a tunable oscillator circuit for outputting a predetermined local oscillation frequency signal to a frequency mixer;
    said frequency mixer for mixing an input data signal and said predetermined local oscillation frequency signal and outputting substantially similar mixed signals on at least two separate paths;
    a current comparing means for comparing said mixed signals and generating a voltage value indicative of a difference in current within said at least two separate paths;
    a gain clipped amplifier for amplifying said voltage value such that a first signal is generated; and
    a decision circuit for receiving said first signal and producing a resultant logic signal.

2. The heterodyne receiver of claim 1, further comprising a low-pass filter for filtering said first signal.

3. The heterodyne receiver of claim 2, wherein said low-pass filter comprises an SMA connector.

4. The heterodyne receiver of claim 1, wherein said tunable oscillator circuit comprises a fast switchable laser.

5. The heterodyne receiver of claim 1, wherein said frequency mixer comprises a 3 dB coupler.

6. The heterodyne receiver of claim 1, wherein said current comparing means comprises two photodiodes and a differential amplifier.

7. The heterodyne receiver of claim 1, wherein said gain clipped amplifier is operated in saturation.

8. The heterodyne receiver of claim 1, wherein said decision circuit produces a logic high output if said first signal is higher than a predetermined threshold and produces a logic low output if said first signal is lower than a predetermined threshold.

9. The heterodyne receiver of claim 1, further comprising at least one respective delay line and at least one respective attenuator in each of said at least two separate paths for making the signal propagation time and loss in said at least two separate paths substantially equal.

10. The heterodyne receiver of claim 1, wherein said decision circuit comprises a limiting amplifier.

11. The heterodyne receiver of claim 1, wherein the substantially similar mixed signals each has a frequency of at least one GHz.

12. An optical switch fabric, comprising:
a plurality of optical transmitters;
a multiplexer for combining the optical channels of said optical transmitters;
a power splitter for splitting said combined optical channels; and
at least one receiver for receiving at least one of said split, combined optical channels, each of said at least one receivers comprising:
  a tunable oscillator circuit for outputting a predetermined local oscillation frequency signal to a frequency mixer;
  said frequency mixer for mixing said received split, combined optical channels and said predetermined local oscillation frequency signal and outputting substantially similar mixed signals on at least two separate paths;
  a current comparing means for receiving said mixed signals via said at least two separate pats and for generating a voltage value indicative of a difference in current within said at least two separate paths;
  a gain clipped amplifier for amplifying said voltage value such that a first signal is generated; and
  a decision circuit for receiving said first signal and producing a resultant logic signal.

13. The optical switch fabric of claim 12, wherein the signals of said plurality of transmitters are delayed replicas of each other, except that two of them are in phase.

14. The optical switch fabric of claim 12, further comprising an amplifier for amplifying said combined optical channels.

15. The optical switch fabric of claim 12, further comprising a polarizer for polarizing said combined optical channels such that all of the optical channels propagate with substantially the sane polarizations.

16. The optical switch fabric of claim 12, further comprising a central clock distribution unit and delay lines.

17. A method of channel selection for use in optical switch fabrics, comprising:
mixing an input data signal and a local oscillation frequency signal from a tunable oscillator circuit to generate substantially similar mixed signals on at least two separate paths;
comparing said mixed signals using a current comparing means and generating a voltage value indicative of a difference in current within said at least two separate paths;
amplifying said voltage value using a gain clipped amplifier such that a first signal is generated; and
determining from said first signal a resultant logic signal.

18. The method of claim 17, wherein the substantially similar mixed signals each has a frequency of at least one GHz.

19. A heterodyne receiver for use in optical switch fabrics a comprising:
means for mixing an input data signal and a local oscillation frequency signal from a tunable oscillator circuit to generate substantially similar mixed signals on at least two separate paths;
means for comparing said mixed signals and generating a voltage value indicative of a difference in current within said at least two separate paths;
means for amplifying said voltage value with gain clipping such that a first signal is generated; and
means for determining from said first signal a resultant logic signal.

20. The heterodyne receiver of claim 19, wherein the substantially similar mixed signals each has a frequency of at least one GHz.

* * * * *